United States Patent
Lee et al.

(10) Patent No.: US 8,054,029 B2
(45) Date of Patent: Nov. 8, 2011

(54) CALIBRATION METHOD FOR SERVO

(75) Inventors: Yung-Shen Lee, Taipei (TW); Shih-Che Hung, Taipei (TW)

(73) Assignee: Micro-Star Int'l Co., Ltd., Jung-He (TW)

( * ) Notice: Subject to any disclaimer, the term of this patent is extended or adjusted under 35 U.S.C. 154(b) by 460 days.

(21) Appl. No.: 12/360,121

(22) Filed: Jan. 27, 2009

(65) Prior Publication Data

US 2010/0026230 A1  Feb. 4, 2010

(30) Foreign Application Priority Data

Jul. 29, 2008  (TW) .............................. 97128705 A

(51) Int. Cl.
  *G05B 1/06*  (2006.01)
(52) U.S. Cl. .................. 318/652; 318/627; 318/567
(58) Field of Classification Search .................. 318/652, 318/627, 567, 569, 280, 466, 562, 272, 400.08, 318/571, 626, 632, 663
  See application file for complete search history.

(56) References Cited

U.S. PATENT DOCUMENTS

2010/0119355 A1* 5/2010 Cox .............................. 415/15
* cited by examiner

*Primary Examiner* — Karen Masih
(74) *Attorney, Agent, or Firm* — Ditthavong Mori & Steiner, P.C.

(57) ABSTRACT

A calibration method for servo is provided, wherein a motor of the servo is activated at a low-speed mode to drive a moved member of the servo moving to a first limit position and a second limit positions. During the movement of the moved member, a motor control power of the motor is monitored continuously to determine whether the motor control power exceeds a threshold value. When the moved member reaches the first or the second limit position, the motor control power is raised to exceed the threshold value and a motor coordinate value corresponding to the first or second limit position is determined simultaneously. Finally, a conservation relation for determining the actual coordinate by the motor value can be derived according to the values of actual coordinate of the first and second limit positions, and the values of the corresponding motor coordinate.

7 Claims, 6 Drawing Sheets

CALIBRATION METHOD FOR SERVO

CROSS REFERENCES TO RELATED APPLICATIONS

This non-provisional application claims priority under 35 U.S.C. §119(a) on Patent Application No(s). 97128705 filed in Taiwan, R.O.C. on Jul. 29, 2008, the entire contents of which are hereby incorporated by reference.

FIELD OF THE INVENTION

The present invention relates to a servo and more particularly, to a method for calibrating a servo without any external detection element.

DESCRIPTION OF RELATED ART

Referring to FIG. 1, a servo 1 includes a motor 2 and a moved member 3 driven by the motor 2. The servo 1 has to be calibrated, such that every time the output of the motor 2 can drive the moved member 3 to reach a designated position or rotate to a predetermined angle.

No matter if the servo 1 outputs linearly or rotationally, the moved member 3 operates within two limit positions located at the opposite ends of the moving path of the moved member 3. If the moving path of the moved member 3 is a linear path, the distance between the two limit positions is the maximum linear displacement of the moved member 3. If the moving path of the moved member 3 is a rotational angle, the two limit positions define the maximum angles of the moved member 3 for forward/reverse rotational displacement.

While performing calibration for the servo 1, detection elements 4 such as sensors or a limit switches must be configured at the limit positions to send back the interrupt trigger signals for the controller to determine whether the moved member 3 reaches the limit positions. When the motor 2 drives the moved member 3 to reach one of the limit positions and contact the detection element 4, the detection element 4 sends an interrupt trigger signal to the controller to cease the operation of the motor 2. Meanwhile the controller record the current motor coordinate value and an actual coordinate value corresponding to the limit position. Next, the motor 2 operates again to drive the moved member 3 to the other limit position. When the moved member 3 contacts the other detection element 4, the motor 2 is stopped again. Then the controller records the current motor coordinate value and the other actual coordinate value corresponding to the other limit position. During the motor 2 outputting rotational displacement, the rotational angle of the output shaft relative to a preset center is fed back to the controller; wherein the rotational angle is the motor coordinate value. The actual displacement (linear displacement or rotational displacement) of the moved member 3 between the two limit position can obtained within designation parameter(s) of the servo 1, that is, the displacement range of the moved member 3 is designated during the design process of the servo 1. Thus, according to actual coordinate values and corresponding motor coordinate values of the two limit positions, the displacement of the motor 2 can be converted into the displacement of the moved member 3. The conversion relation of the motor coordinate and the actual coordinate can be further derived. Thereby the motor coordinate can be mapped to the actual coordinate of the moved member. Afterwards, as long as the motor 2 returns the motor coordinate value, the controller can convert the motor coordinate value into the actual coordinate value of the moved member 3.

However, to performing the aforementioned calibration method, the detection elements 4 are required to determine whether the moved member 3 of the servo 1 is moved to the limit position(s), so as to calculate the maximum displacement of the servo 1. In addition, the configuration of the detection elements 4 increases the element amount of the servo 1 and increases the manufacturing cost. Furthermore, to dispose the detection elements 4 inside the servo 1 with limited space therein is difficult which cause the problems of assembling the servo 1.

SUMMARY OF THE INVENTION

In view of the aforementioned problems, the present invention provides a calibrating method for a servo, by the method the servo is calibrated without any additional detection element. The method simplifies the structure of the servo and reduces the manufacturing cost of the servo.

The servo includes a motor and a moved member. The moved member is driven by the motor to move between a first limit position and a second limit position. A moving path of the moved member forms an actual coordinate, and the displacement and rotating direction of the motor form a motor coordinate. According to the calibration method provided by the present invention, the motor is activated at a low-speed mode to drive the moved member moving toward the first limit position. Meanwhile, a motor control power is monitored continuously to determine whether the motor control power of the motor exceeds a threshold value. When the moved member reaches the first limit position, the motor control power is raised to exceed the threshold value and the motor coordinate value corresponding to the first limit position is determined. Next, the motor is driven at the low-speed mode to drive the moved member moving toward the second limit position, thereby using the same method to determine the motor coordinate value corresponding to the second limit position. Finally, the actual coordinate value of the first limit position, the actual coordinate value of the second limit position, the motor coordinate value corresponding to the first limit position, and the motor coordinate value corresponding to the second limit position are used to derive a conversion relation between the motor coordinate and the actual coordinate. Afterwards, when proceeding with the operation of the servo, it is easy to determine the actual coordinate of the moved member corresponding to the motor coordinate.

The advantage of the present invention lies in that the structure of the servo is simplified due to detection elements for confirming whether the moved member reaches an limit position is not required anymore. Instead, through detection of the motor control power, the moved member may be detected whether or not it reaches the limit position.

These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
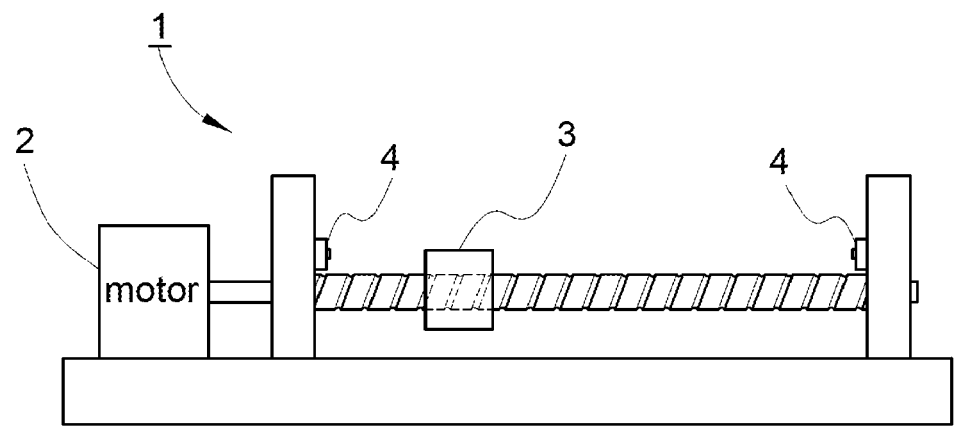
FIG. 1 is an schematic view of a servo in the prior art.

Reference will now be made in detail to the present preferred embodiments of the invention, examples of which are illustrated in the accompanying drawings. Wherever possible, the same reference numbers are used in the drawings and the description refers to the same or the like parts.

Figure 2:
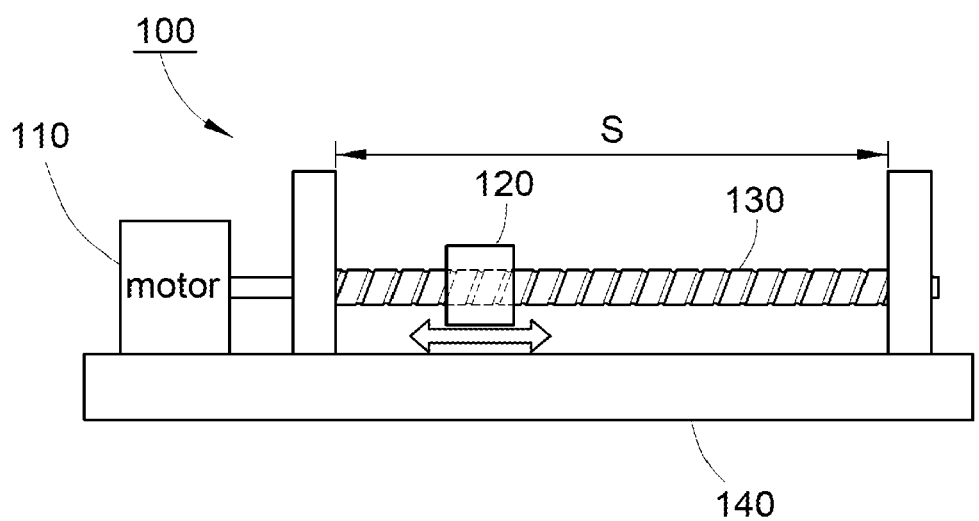
FIG. 2 and FIG. 3 are schematic views of a servo in an embodiment of the present invention.
Figure 3:
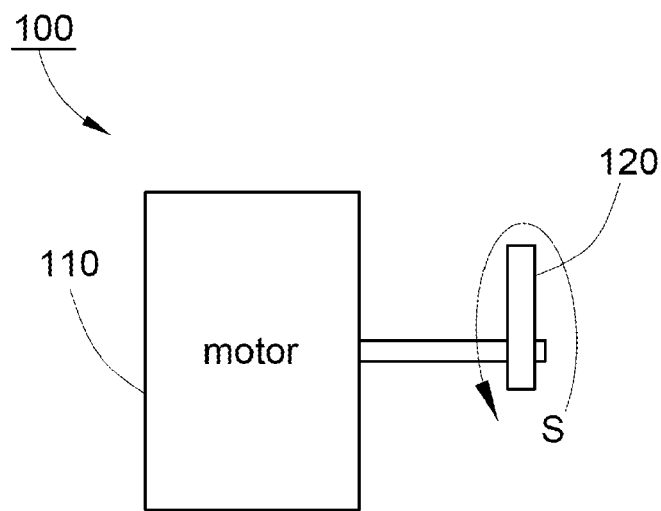

Referring to FIG. 2 and FIG. 3, a calibration method according to an embodiment of the present invention is provided for a servo 100 as shown the figures. The method is used to derive the relationship between the displacement of motor 110 and the displacement of moved member 120, thereby facilitating calibration of servo 100.

Referring to FIG. 2 and FIG. 3, two different types of the servo 100 are shown. Each type of the servo 100 includes a motor 110 and a moved member 120. The motor 110 drives the moved member 120 to move along a moving path S. The moving path S can be a linear path or a rotational angle. When the moving path S is a linear path, an output shaft of the motor 110 is coupled to the moved member 120 through a transmission device 130, such as a spiral shaft or belt, wherein the transmission device 130 transfers the rotational output of the motor 110 into linear output, thereby driving the moved member 120 to move linearly on a base 140. The path that the moved member 120 moves on the base 140 is namely the moving path S, as shown in FIG. 1. When the moving path S is a rotational angle, the output shaft of the motor 110 is directly connected to or indirectly connected to (through a gear set) the moved member 120, so as to drive the moved member 120 to rotate back and forth. The rotational displacement of the moved member 120 is the moving path S, as shown in FIG. 2.

Figure 4:
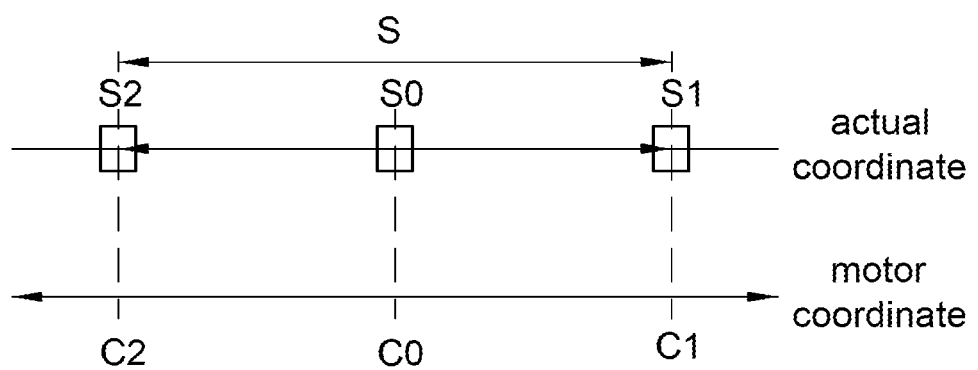
FIG. 4 is a relationship diagram of motor coordinate versus actual coordinate in the embodiment of the present invention.

Referring to FIG. 4, two ends of the moving path S are defined as a first limit position S1 and a second limit position S2, and the moved member 120 can only move between the first limit position S1 and the second limit position S2. The distance between the first limit position S1 and the second limit position S2 is the length of the moving path S, which is determined during the design stage of the servo 100. Along the extending direction of the moving path S, a 1D (one-dimension) coordinate system is formed to indicate the actual coordinate of the moved member 120. The unit of the actual coordinate is linear distance or angle (depending on the type of the moving path S). Generally, original point S0 of the actual coordinate is preset at the middle of the moving path S, and the length of the moving path S is the absolute value of S1-S2. The foregoing S0, S1, S2 are designation parameters, and therefore may be derived directly from the designation parameters upon completion of configuring the servo 100; of course, actual measurement may also be applied to obtain more precise values.

Figure 5:
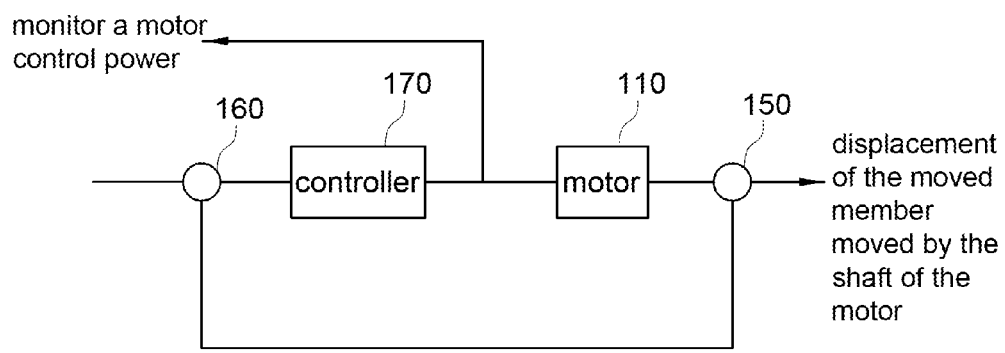
FIG. 5 is a system block diagram of the servo in the embodiment of the present invention.

Referring to FIG. 4 and FIG. 5, the servo 100 further includes a position sensor 150 to detect the current motor coordinate value of the output shaft of the motor 110. The rotational displacement and rotating direction of the output shaft of the motor 110 relative to the initial state of the output shaft form the motor coordinate the current. That is, a random state may be selected as the initial state of the motor 110. When the servo 100 is completely configured, the angle of the output shaft at this initial state will be defined as the center of the motor coordinate, thus the motor coordinate value is 0. After the motor 110 outputs rotational displacement, the rotating direction and rotational displacement needed to rotate from the initial state of the output shaft is considered as the current motor coordinate value. The motor coordinate value may be indicated by radian (rad), degree, or a self-defined unit. The position sensor 150 is used to sense the operation of the motor 110 and to record the displacement of the motor 110, thereby obtaining the motor coordinate value. The position sensor 150 is usually a rotary encoder that is triggered by the rotation of the motor 110 to generate counting signals for recording the rotation direction of the motor 110 and the rotational angle. Every time the motor 110 rotates to a specific small angle, the position sensor 150 outputs a counting signal to a control circuit and the counter 160 accumulates or decreases the count value according to the rotation direction. The count value may be considered as a self-defined unit of a rotational displacement and used as the motor coordinate value. When configuring the servo 100, the output shaft of the motor 110 is to stay at a central point C0 of detectable range of the position sensor 150. Such a state is defined as the center of the motor coordinate. The moved member 120 will be moved to the original point S0 of the actual coordinate and connected with the output shaft of the motor 110.

Figure 6:
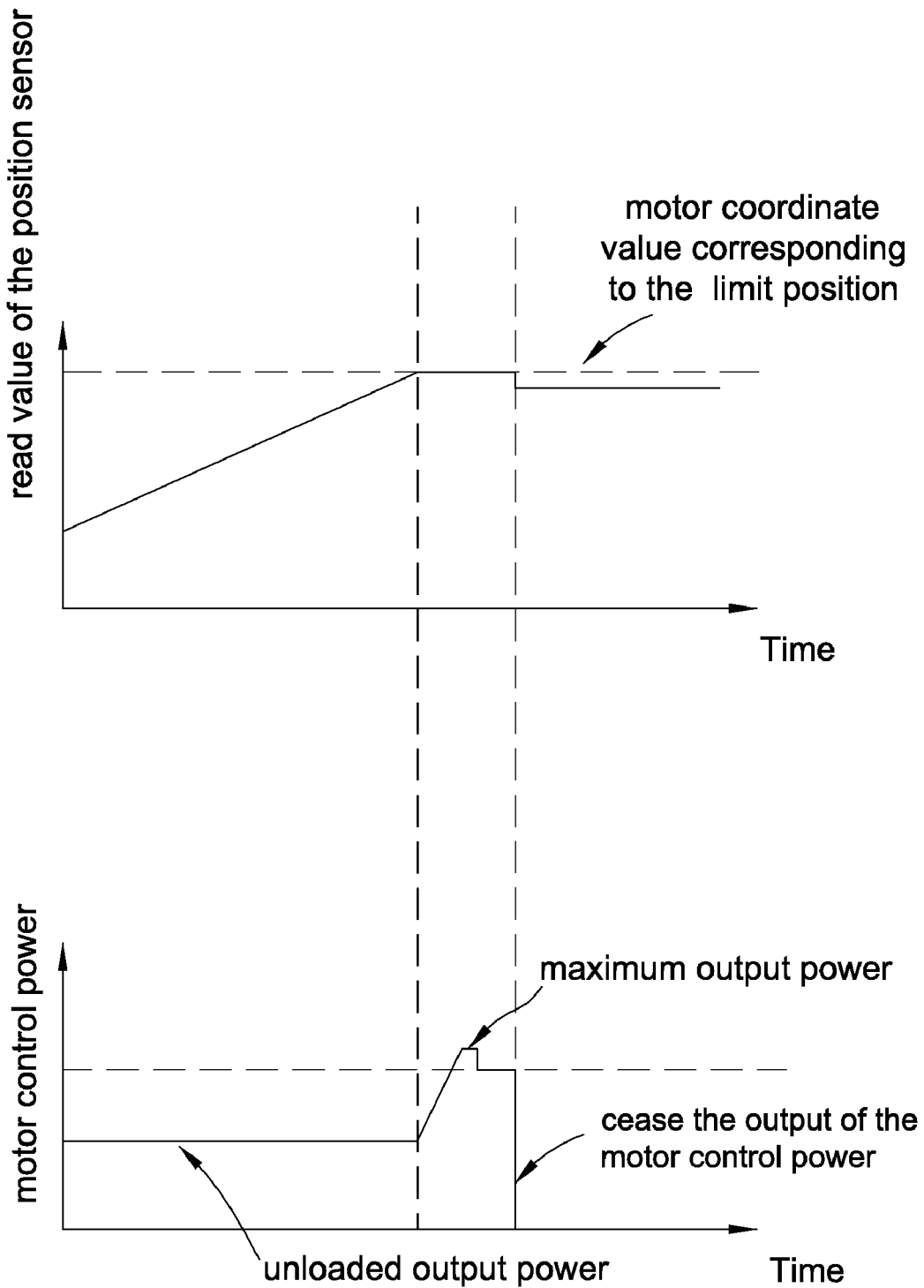
FIG. 6 is a variation diagram of motor control power in the embodiment of the present invention.

Referring to FIG. 5 and FIG. 6, after the motor 110 receives a motor control power, the motor 110 starts to proceed with the output of rotational displacement. The motor control power is usually in form of Pulse Width Modulation (PWM) signal. Only a high-level of PWM signal makes the motor 110 rotate. During every period of the PWM, the motor 110 is driven to rotate only a fixed and small angle, so that rotational displacement of the motor 110 may be achieved more precisely. When the motor 110 is activated at a low speed to output the rotational displacement with the moved member 120 suffering no interference but only fixed frictional force, the moved member 120 will continuously move at a fixed speed. Meanwhile, the motor control power for the motor 110 will remain at an unloaded output power. When moved member 120 suffers resistances, increasing resistances are forced to the motor 110 and the motor control power will increase according to the increasing resistance. When the motor 110 drives the moved member 120 to move and reach the first limit position S1 or the second limit position S2, structures at the first limit position S1 or the second limit position S2 will block the moved member 120 and prevent the moved member 120 from moving any further, and then feed back resistance to the motor 110. Since the first limit position S1 or the second limit position S2 are fixed with their resistance considered infinitely huge, the motor control power will be raised rapidly to the maximum output power and then fall slightly. Afterwards, the controller 170 will cease to supply motor control power to the motor 110. In such a case the values of the position sensor 150 will be read increasingly gradually, and then the read value of the position sensor 150 will cease to change when the motor control power is rapidly raised. That means the moved member 120 reaches the limit position and can not move any further. At this moment the read value of the position sensor 150 corresponds to the motor coordinate value of the limit position. During the calibration of the servo 100, there is no external loading applied to the moved member 120, so only when the moved member 120 reaches the first limit position S1 or the second limit position S2, will the motor control power generate a pulse and stay at the maximum output power. Therefore, the pulse generated by the rapid raise of the motor control power is considered as a signal indicating that the moved member 120 reaches the first limit position S1 or the second limit position S2; such signal is fed back to the controller 170 and makes the controller 170 cease the output of the motor control power. Consequently, to confirm whether the motor 110 drives the moved member 120 to reach the first second limit position S1 or the second limit position S2, the motor control power is monitored continuously to determine whether the motor control power exceeds a threshold value. Such threshold value may be preset equal to the maximum output power of the motor control power, or be present as a value smaller than the maximum output power and greater than the unloaded output power.

Figure 7A:
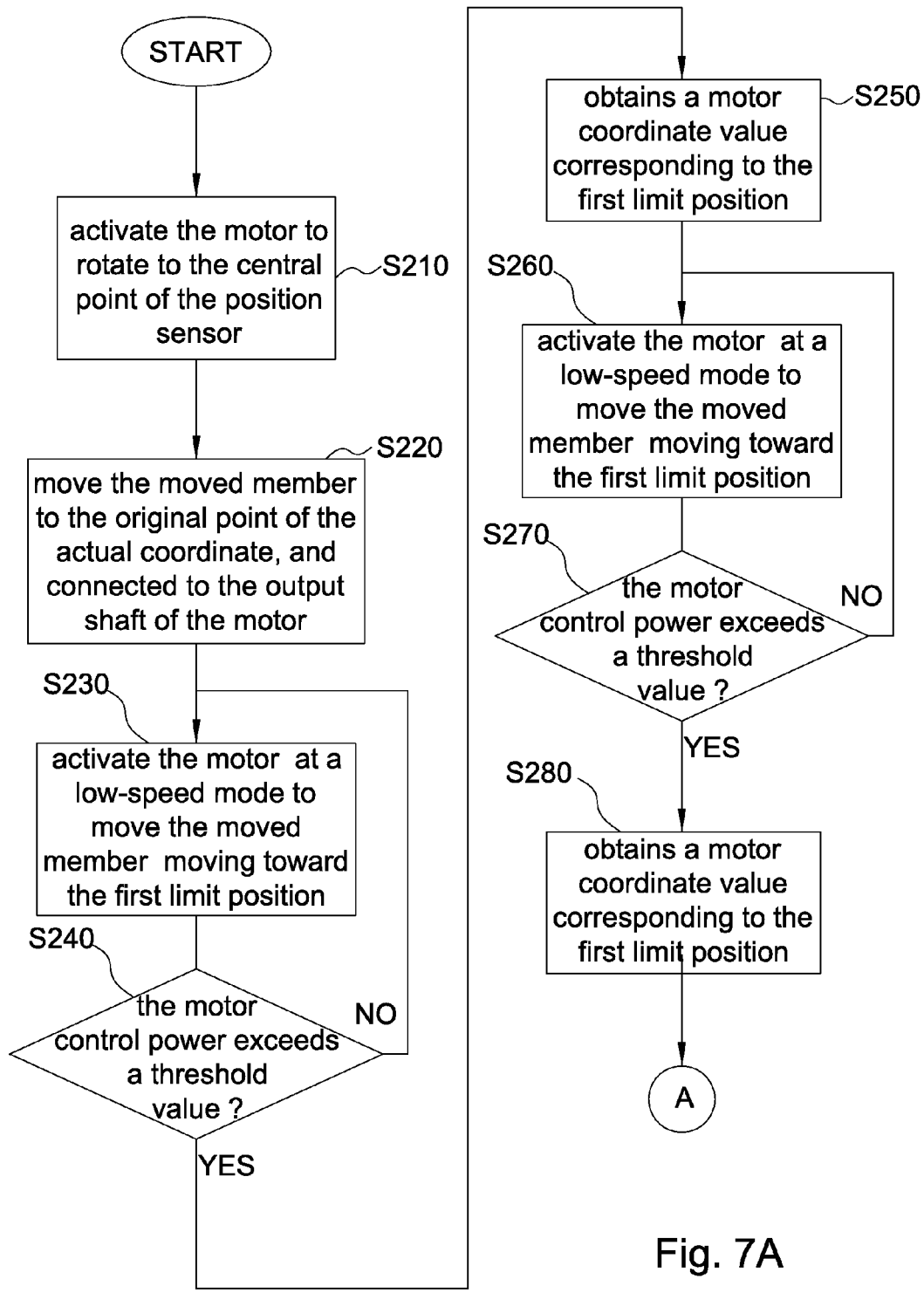
FIG. 7A and FIG. 7B are flow charts of the method according the present invention.
Figure 7B:
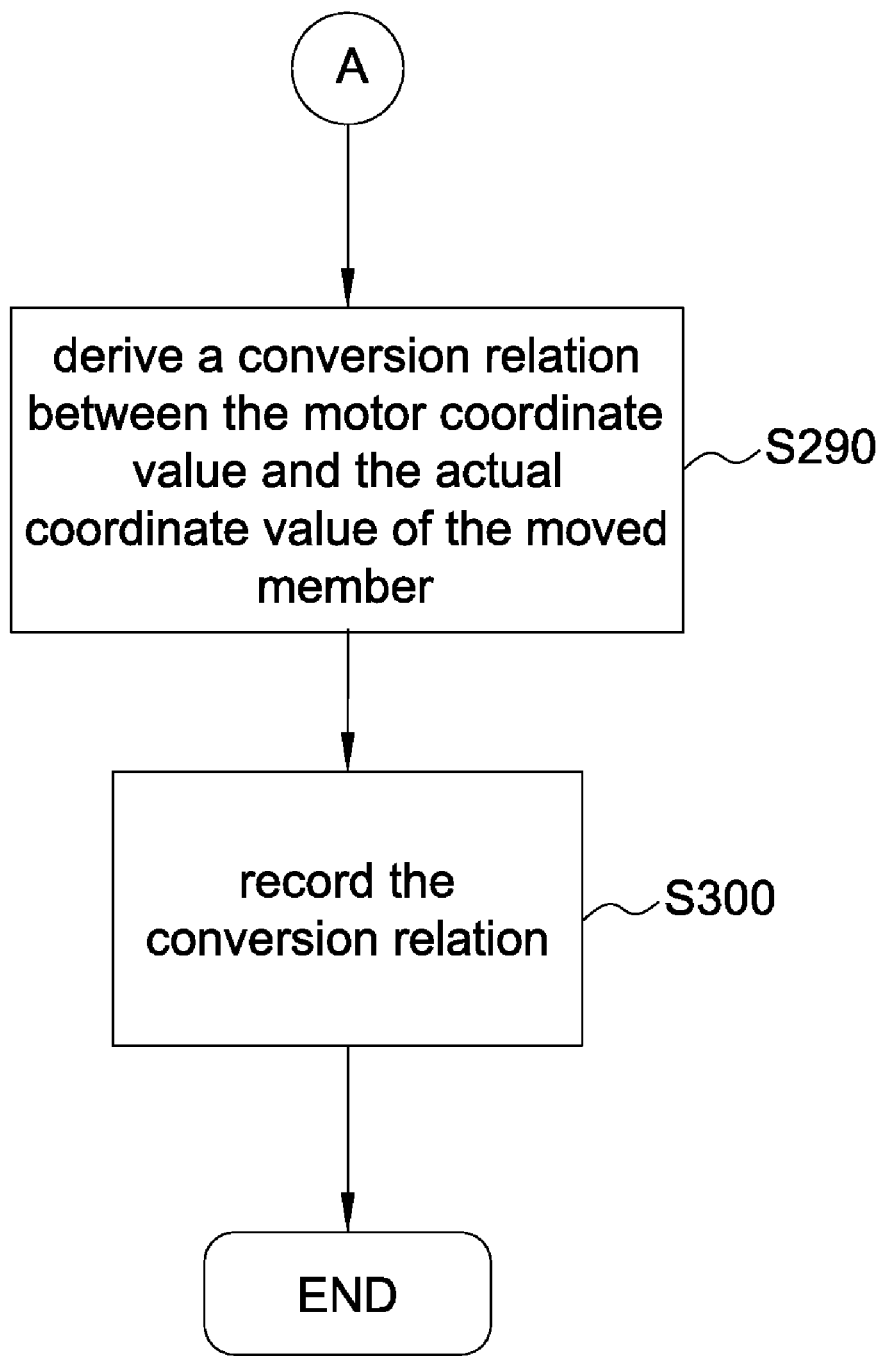

Please refer to FIG. 7A and FIG. 7B, flow charts of the method according the present invention.

Please also refer to FIG. 4, FIG. 5 and FIG. 6. At first, the controller 170 activates the motor 110 to rotate to the central point of the position sensor 150, namely the center of the motor coordinate (S210). Then the moved member 120 is moved to the original point S0 of the actual coordinate, and connected to the output shaft of the motor 110 (S220).

The controller 170 activates the motor 110 at a low-speed mode to move the moved member 120 moving toward the first limit position S1 (S230). During the movement of the moved member 120, the motor control power remains at an unloaded output power, and meanwhile the controller 170 continuously monitors the motor control power of the motor 110 to determine whether the motor control power of the motor 110 exceeds a threshold value (S240). If the motor control power exceeds the threshold value, the motor control power is considered to experience a pulse; namely the moved member 120 contacts the structure that forms the first limit position S1. Taking the occurrence of the pulse as an interrupt signal the controller 170 ceases to output the motor control power, and then the controller 170 makes the motor 110 stop driving the movement of the moved member 120. Meanwhile, from the position sensor 150, the controller 170 obtains a motor coordinate value C1 corresponding to the first limit position S1 (S250).

Next, the controller 170 activates the motor 110 at the low-speed mode to move moved member 120 moving toward the second limit position S2 (S260). Similarly, during the movement of the moved member 120, the controller 170 continuously monitors the motor control power of the motor 110 to determine whether the motor control power exceeds the threshold value, so as to determine whether the moved member 120 reaches the second limit position S2 (S270). When the moved member 120 reaches the second limit position S2, the controller 170 ceases outputting the motor control power and makes the motor 110 stop driving the movement of the moved member 120. Meanwhile the position sensor 150 obtains the motor coordinate value C2 corresponding to the second limit position S2 (S280).

Subsequently, proceed with proportion conversion; use actual coordinate value of the first limit position S1, actual coordinate value of the second limit position S2, and the corresponding motor coordinate values C1, C2, to derive a conversion relation between the motor coordinate value and the actual coordinate value of the moved member 120 (S290). Then, record the conversion relation (S300), and complete the calibration. Afterwards, whenever a motor coordinate value is obtained from the position sensor 150, the actual coordinate value of the moved member 120 will be calculated by applying that motor coordinate value into the conversion relation.

During the calibration, operation of the motor 110 has to be ceased when the moved member 120 reaches the first or the second limit position S1, S2, so as to determine the corresponding motor coordinate values. Therefore, detection elements are required to detect whether the moved member 120 reaches the first or the second limit position S1, S2 in the prior art. In the present invention, additional detection elements is not required to be configured in the servo 100 to detect whether moved member 120 reaches the first or the second limit position S1, S2. Instead, in the present invention the changes of the motor control power output from the controller to the motor 110 is directly monitored. A pulse in the output of the motor control power is defined by the motor control power exceeding the threshold value, thereby confirming the timing that the moved member 120 reaches the first or the second limit position S1, S2. No additional detection element is required for the servo 100. The amount of the components constructing the servo 100 is reduced, as well as the difficulty for assembling the servo 100 and the manufacturing cost of the servo 100.

Additional advantages and modifications will readily occur to those proficient in the relevant fields. The invention in its broader aspects is therefore not limited to the specific details and representative embodiments shown and described herein. Accordingly, various modifications may be made without departing from the spirit or scope of the general inventive concept as defined by the appended claims and their equivalents.

What is claimed is:

1. A calibration method for a servo, wherein the servo comprises a motor and a moved member, the moved member being driven by the motor to move between a first limit position and a second limit position, a moving path of the moved member forming an actual coordinate, a displacement and a rotating direction of the motor forming a motor coordinate, the method comprising the steps of:
   activating the motor at a low-speed mode to drive the moved member moving toward the first limit position;
   monitoring a motor control power of the motor continuously, and determining whether the motor control power exceeds a threshold value;
   determining a motor coordinate value corresponding to the first limit position when the motor control power exceeds the threshold value;
   activating the motor at the low-speed mode to drive the moved member moving toward the second limit position;
   monitoring the motor control power of the motor continuously, and determining whether the motor control power of the motor exceeds the threshold value;
   determining another motor coordinate value corresponding to the second limit position when the motor control power exceeds the threshold value; and
   deriving a conversion relation between the motor coordinate and the actual coordinate by using the actual coordinate value of the first limit position, the actual coordinate value of the second limit position, the motor coordinate value corresponding to the first limit position, and the motor coordinate value corresponding to the second limit position.

2. The calibration method as claimed in claim 1, further comprising a step of controlling the motor to rotate to a center of the motor coordinate, and moving the moved member to an original point of the actual coordinate to connect with an output shaft of the motor.

3. The calibration method as claimed in claim 1, wherein displacement on the actual coordinate is linear displacement or angular displacement.

4. The calibration method as claimed in claim 1, wherein the motor control power is output in form of Pulse Width Modulation ,PWM, signals.

5. calibration method as claimed in claim 1, wherein the motor control power at the low-speed mode is an unloaded output power and the motor control power when the moved member reaches the first limit position or the second limit position is raised to a maximum output power.

6. The calibration method as claimed in claim 5, wherein the threshold value is smaller than the maximum output power.

7. The calibration method as claimed in claim 5, wherein the threshold value is greater than the unloaded output power, and smaller than the maximum output power.

* * * * *